United States Patent [19]
Francois

[11] 3,742,557
[45] July 3, 1973

[54] HINGE FASTENER FOR CONVEYOR BELTS
[75] Inventor: Edgar Francois, Wayne, N.J.
[73] Assignee: Uniroyal Inc., New York, N.Y.
[22] Filed: May 14, 1971
[21] Appl. No.: 143,537

[52] U.S. Cl. .................................... 24/33 B, 85/1 P
[51] Int. Cl. ......................... F16g 3/02, F16b 35/00
[58] Field of Search ...................... 74/231 J; 85/1 P, 85/37, 68; 24/37, 31 H, 31 L, 33 B, 33 P, 33 L

[56] References Cited
UNITED STATES PATENTS

| | | | |
|---|---|---|---|
| 41,170 | 1/1864 | Reed | 85/1 P UX |
| 453,515 | 6/1891 | Smith | 24/33 B |
| 2,666,241 | 1/1954 | Hall | 24/31 H X |
| 3,176,358 | 4/1965 | Leflon | 24/33 B |

FOREIGN PATENTS OR APPLICATIONS

| | | | |
|---|---|---|---|
| 1,233,111 | 5/1960 | France | 24/33 B |
| 845,775 | 8/1952 | Germany | 24/31 H |
| 228,318 | 2/1925 | Great Britain | 24/33 B |
| 860,147 | 2/1961 | Great Britain | 24/33 B |
| 85,166 | 3/1955 | Norway | 85/1 P |

*Primary Examiner*—Donald A. Griffin
*Attorney*—Norbert P. Holler

[57] ABSTRACT

A hinge fastener for conveyor belts is disclosed, including a pair of parallel-plate, interdigitated connectors secured to opposed ends of the belt by a plurality of rivets arranged selectively so as to optimize the strength of the fastener relative to the strength of the belt, and a hinge pin interconnecting the pair of connectors. The connectors are adapted to pivot freely relative to one another over prolonged periods of use without any subsequent loss of freedom or movement therebetween. The plates of each connector are bent inwardly but in a non-aligned fashion at their free end edges so as to bite slightly into the belt body without pinching the same between the bent-in edges. A mandrel adapted to be used in inserting the rivets in the belt for securing the connectors thereto, and self-extracting from both the rivets and the belt body, is also disclosed. This abstract is not to be taken either as a complete exposition or as a limitation of the present invention, however, the full nature and extent of the invention being discernible only by reference to and from the entire disclosure.

9 Claims, 14 Drawing Figures

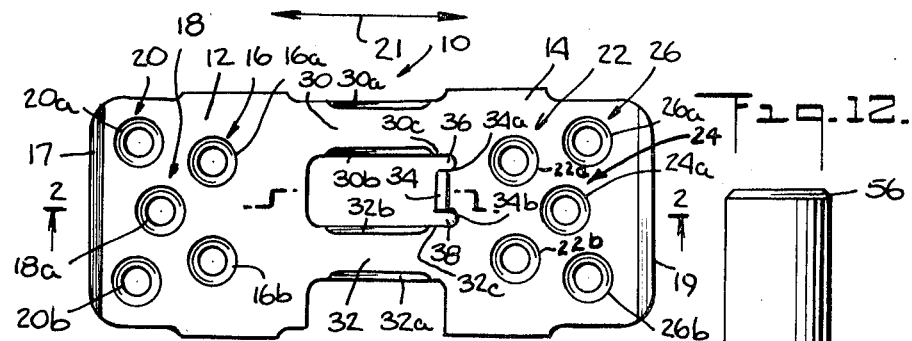
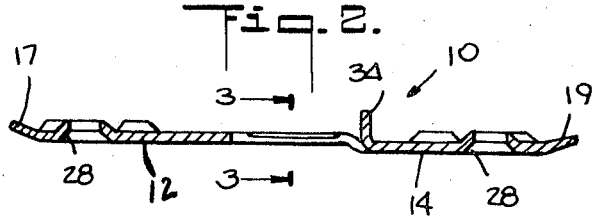
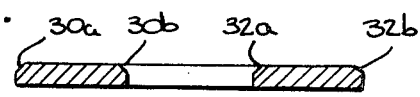
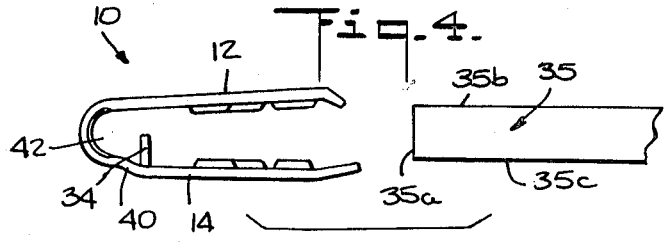
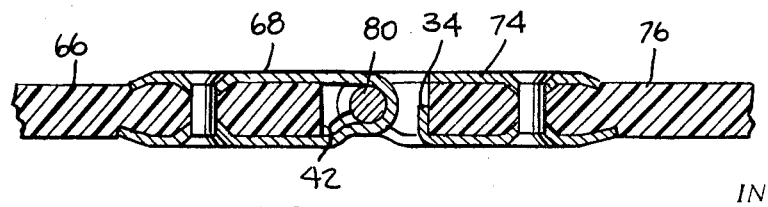

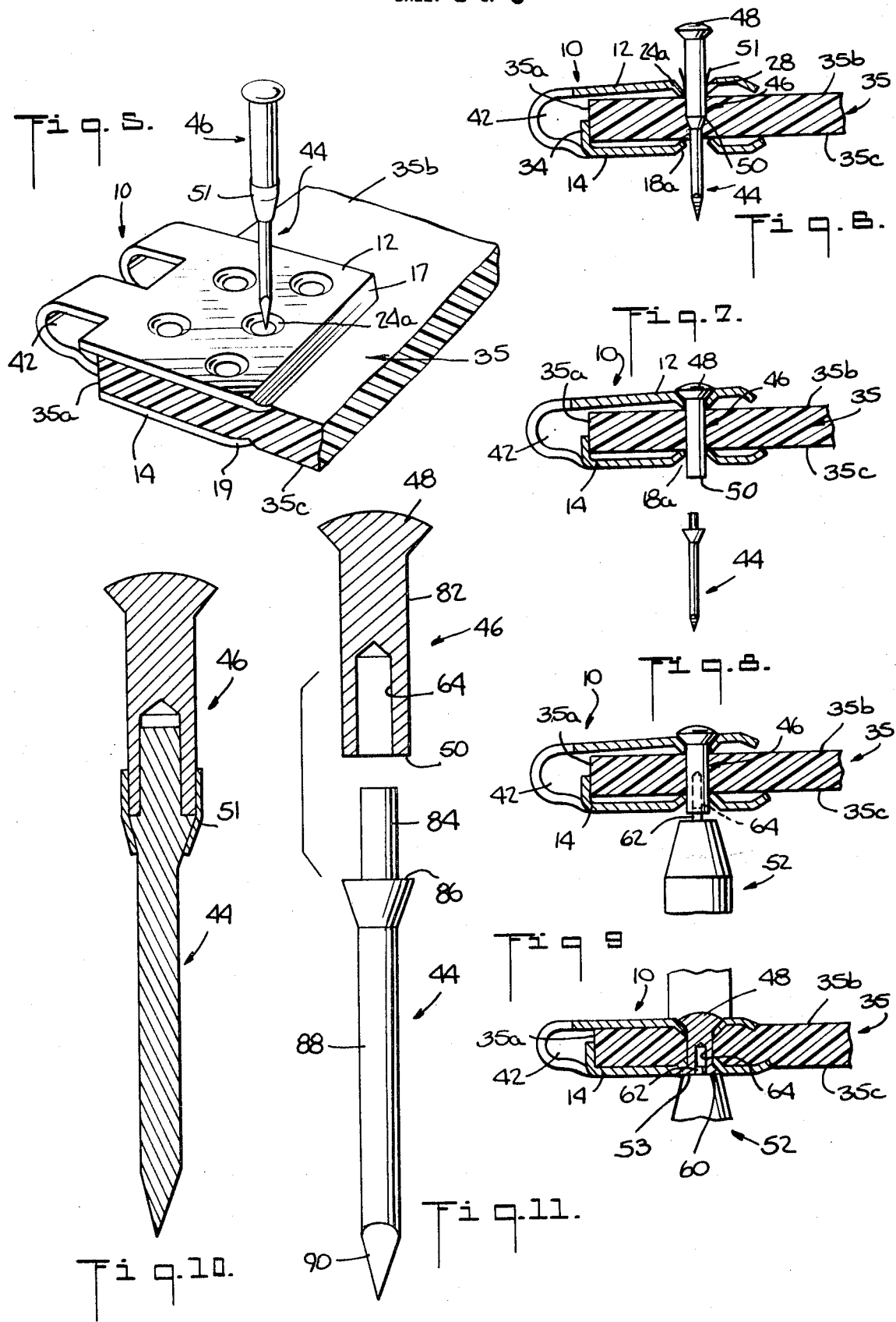

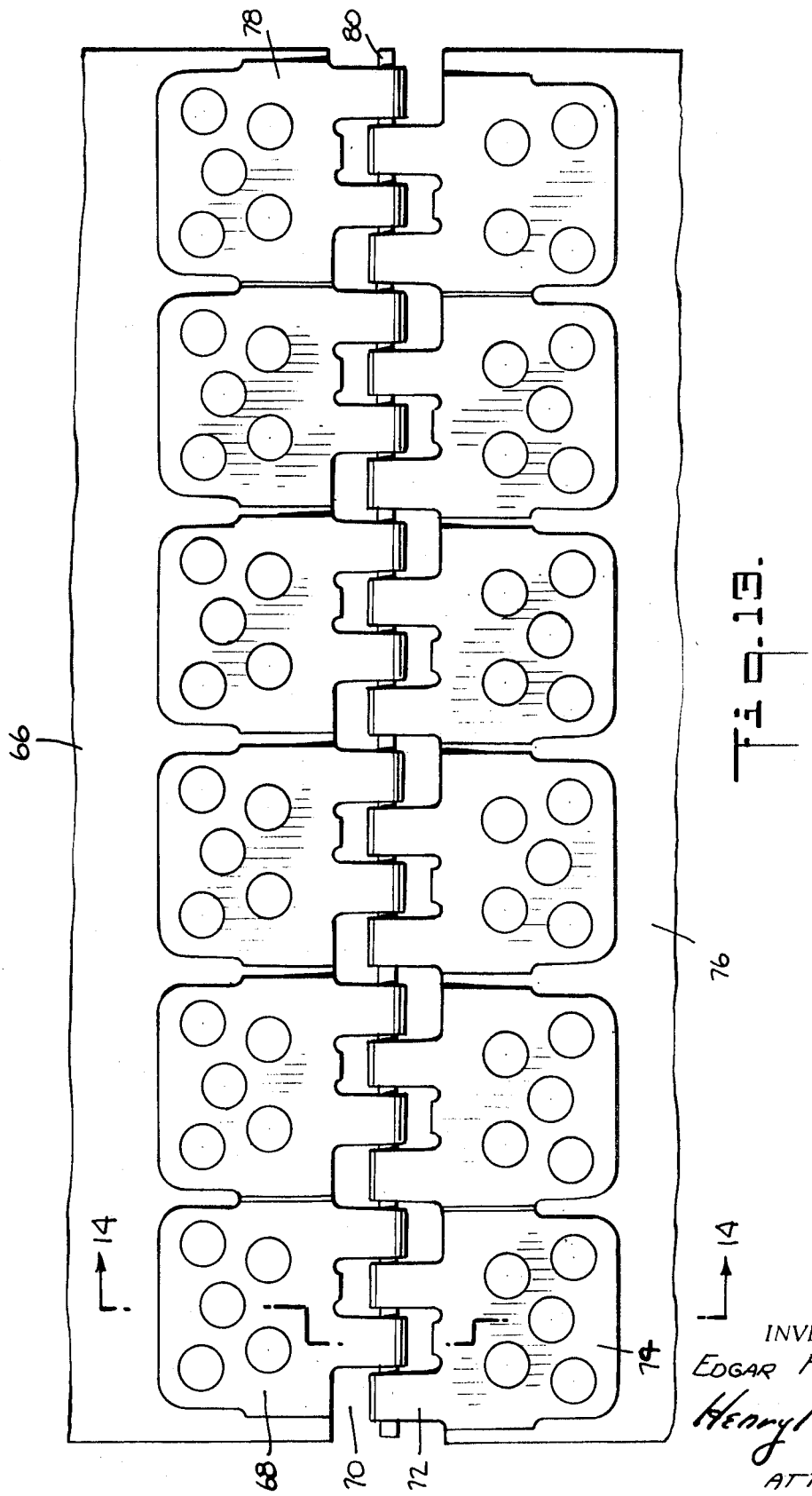

HINGE FASTENER FOR CONVEYOR BELTS

BACKGROUND OF THE INVENTION

The present invention relates generally to hinge fasteners for conveyor belts, and more particularly concerns a fastener which pivots freely after repeated usage, and which has an adjustable load carrying capability.

A typical prior art fastener for conveyor belts is disclosed in U.S. Pat. No. 3,176,358 issued to Leflon on Apr. 6, 1965. This fastener includes a plurality of rigid, preferably U-shaped connectors adapted to be riveted to each end of the belt. The connectors are arranged with the end curves thereof adapted to receive a hinge pin which is inserted between them so that the connector on one end of the belt is connected pivotably to the connector on the other end of the belt. A conventional hinge pin is usually a steel cable having a plastic coating or sheath thereon. The plastic coating reduces friction, and, thereby enables one of the connectors to pivot freely about the hinge pin relative to the other connector. However, after prolonged usage, the connectors often bite into the plastic coating of the hinge pin so as to score the hinge pin and interfere with the subsequent free movement of the connectors relative to each other.

In typical prior art arrangements the tensile forces that can be applied to the fastener are generally considerably less than the tensile forces that the belt itself can withstand. The premature fastener failure or "pullout" of the belt at the rivets is a result of the high localized stress concentrations in the vicinity of the rivets. While increasing the number of rivets in a single row increases the maximum "pullout" load, a practical limit is soon reached wherein only sufficient belt material remains between adjacent rivet holes to sustain the force developed. Moreover, the "pullout" load in such fasteners is essentially a fixed value, there being no practical method for adjusting the "pullout" load to optimize the fastener strength relative to the belt strength.

Heretofore a rivet was generally installed by a mandrel having an outer diameter greater than the outer diameter of the rivet body. Hence such a conventional mandrel formed a rivet hole in the conveyor belt which was generally oversized. As a result the rivet was often spaced from the wall in the hole of the conveyor belt. Rivets installed in such oversized holes are skewed therein and may fail to properly fasten the connectors to the conveyor belt. Furthermore, the conventional mandrel used to form the hole in the conveyor belt must be extracted from the rivet, i.e., the mandrel is not self-extracting therefrom and it remains affixed to the rivet until removed therefrom by a separate, subsequent operation. Thus, a considerable amount of time and labor is expended by having to remove the mandrel from the rivet, thereby resulting in ensuing higher product costs.

In order to overcome many of the disadvantages associated with conventional fasteners previously utilized, there is, in accordance with the present invention, provided a fastener having an adjustable load carrying capability, and whose connectors continue to remain free to pivot relative to one another even after extensive usage. The rivets are adapted to be installed by a mandrel so as to properly secure the connectors to the belt, while the mandrel is self-extracting therefrom.

Accordingly, it is a primary object of the present invention to provide a fastener having connectors that are designed to pivot freely relative to one another over prolonged periods of time.

Another object of the present invention is to provide a fastener having an adjustable load carrying capability so that the strength of the fastener may be easily optimized relative to the strength of the conveyor belt on which it is secured.

An additional object of the present invention is to provide a mandrel adapted to install rivets in the conveyor belt such that the rivets tightly secure the connectors to the conveyor belt.

A further object of the present invention is to provide a mandrel adapted to install a rivet in the conveyor belt in such a manner that the mandrel is self-extracting from the rivet.

Still another object of the present invention is to provide a method of installing the rivets such that the connectors are tightly secured to the conveyor belt.

Still an additional object of the present invention is to provide a method of installing the rivets such that the fastener has a preselected load carrying capability.

Still a further object of the present invention is to provide fasteners which are relatively economical in the installation, use and manufacture thereof.

SUMMARY OF THE INVENTION

Briefly stated, and in accordance with the present invention, there is provided a hinge fastener for connecting pivotably the ends of a conveyor belt. Preferably, the hinge fastener includes a pair of connector members fastened to the ends of the belt, rivet member securing the connector members to opposed ends of the conveyor belt, and a hinge pin connecting the connector member to one another. The connector members are designed to pivot freely about the hinge pin relative to one another, without biting into the coating on the hinge pin and thereby resulting in subsequent loss of free movement therebetween.

In accordance with a further aspect of the present invention, the connector members include a plurality of holes arranged in rows, each hole being adapted to receive a rivet member which passes through the belt so as to fasten the connector member thereto. Each successive row of holes is spaced farther from the hinge pine than the preceding row of holes, each row including at least one hole therein. THe holes of each row are staggered from the holes of any other row so as to provide the maximum resistance to failure. The strength of the fastener may be adjusted by varying the number of rivet members and the selected holes in which they are placed. In use, an appropriate rivet configuration is selected so as to optimize the strength of the fastener relative to the strength of the belt on which it is secured.

According to the present invention there is also provided a method of installing the rivet members used to fasten the connector members on the ends of the conveyor belt with a mandrel member. One end portion of the mandrel member is designed to support the rivet member thereon, while the other end portion of the mandrel member is tapered to a point for piercing the material of the conveyor belt. The mandrel member pierces the belt so as to form a hole therein, and, simultaneously therewith, places the rivet member in the hole such that the wall thereof is substantially in engagement with the body of the rivet member. According to the method of the present invention, after inserting the rivet member, the mandrel member self-extracts from he rivet member, thereby eliminating the need for the additional step of removing the mandrel member therefrom.

BRIEF DESCRIPTION OF THE DRAWINGS

Other objects and advantages of the present invention will become apparent upon reading the detailed description and upon reference to the drawings, in which:

FIG. 1 is a plan view of the preferred embodiment of a connector member of the present invention, shown flat, prior to being folded back over itself into a U-shaped configuration;

FIG. 2 is a sectional view taken along the line 2—2 of FIG. 1 in the direction of the arrows;

FIG. 3 is a sectional view taken along the line 3—3 of FIG. 2 in the direction of the arrows;

FIG. 4 is an exploded elevational view of the connector member being placed on the end of a conveyor belt;

FIG. 5 is a fragmentary perspective view of the end of the conveyor belt with the connector member thereon and shows a rivet member with a mandrel member thereon positioned thereover for installation therein;

FIG. 6 is a fragmentary elevational, partially sectional view of the end of the conveyor belt with the connector member having the rivet member passing therethrough and the mandrel member still on the rivet member;

FIG. 7 is a fragmentary exploded sectional view of the end of the conveyor belt with the connector member having the rivet member passing therethrough, and the mandrel member disengaged therefrom;

FIG. 8 is a fragmentary sectional view of the end of the conveyor belt shown in FIG. 7 and illustrates a rivet deforming member in engagement with the rivet member;

FIG. 9 is a sectional view similar to FIG. 8 and shows the rivet deforming member deforming the rivet member;

FIG. 10 is an enlarged axial sectional view of a rivet member secured to a mandrel member;

FIG. 11 is an exploded partially sectional view of a rivet member and its associated mandrel member;

FIG. 12 is an enlarged elevational view of a rivet deforming member;

FIG. 13 is a plan view of two ends of a conveyor belt having opposed connector members secured to the ends of the belt with hinge pin inserted therethrough; and FIG. 14 is a sectional view taken along the line 14—14 of FIG. 13 in the direction of the arrows.

While the present invention will be described in connection with a preferred embodiment and method associated therewith, it will be understood that is is not intended to limit the invention to that embodiment and method. On the contrary, it is intended to cover all alternatives, modifications and equivalents as may be included within the spirit and scope of the invention as defined by the appended claims.

DETAILED DESCRIPTION OF THE INVENTION

With continued references to the drawings, wherein like reference numerals have been used throughout to designate like elements, a hinge fastener is disclosed which includes connector members clamped on the ends of the conveyor belt and connected pivotably to one another by a hinge pin. The connector members are fastened on the respective ends of the belt by rivet members.

Turning first to FIG. 1, there is shown one connector member, generally indicated by the reference numeral 10, prior to being bent back over itself into a U-shape. In accordance with the present invention, connector member 10, includes an upper plate 12 and a lower plate 14. Upper plate 12 has, according to one embodiment of the invention, five holes therein, the holes being spaced from on another. The first row of holes, designated generally at 16, includes two holes 16a and 16b and is spaced farthest from the free end portion 17 of the upper plate 12. The second row of holes, shown generally at 18, includes one hole 18a, and is spaced closer than the first row 16 to the free end portion 17 of upper plate 12. Similarly, the third row of holes, designated generally at 20, also includes two holes 20a and 20b, and is spaced closer than the second row 18 from the free end portion 17 of upper plate 12. The holes of each row are staggered from the holes of any other row so that, preferably, no two orifices are aligned with one another in a direction corresponding to the longitudinal axis of the conveyor belt, indicated by arrow 21 in FIG. 1. This also corresponds to the direction of the "pullout" load. In a similar manner, lower plate 14 includes three rows of holes shown generally at 22, 24, and 26, the holes 22a–22b, 24b and 26a–26b rows also being staggered from one another as was hereinbefore described for upper plate 12. The holes of each row are, preferably, staggered from the holes of any other row such that, when the connector members are riveted to the belt, the load is transferred uniformly to the belt. In this manner, the effect of each rivet member used to secure the connector member to he end of the belt is maximized to thereby provide maximum resistance to he "pullout" load. Hence, an arrangement of holes such that the rivet members are staggered from one another is highly efficient.

The connector members are generally made first in flat form (FIG. 1) by a suitable stamping operation, whereas the holes therein are formed, thereafter, by a conventional punching operation. Preferably, the holes formed in the connector members have about a 0.200 inch diameter. The connector members are made preferably of a suitably hard corrosion resistant metal, such as stainless steel, straight steel, or alloys such as monel.

Prior to being installed, the connector members are bent into a U-shape, the upper plate 12 of each such member preferably being (see FIG. 4) at an acute angle with respect to the lower plate 14 thereof, e.g., at an angle of from about 5° to about 10°. Upper plate 12 is adapted to be positioned on the top of the conveyor belt and lower plate 14 is adapted to be positioned on the bottom, i.e., pulley side, of the conveyor belt. Holes 22a and 22b of lower plate 14 are aligned with corresponding holes 16a and 16b of upper plate 12. Similarly, hole 24a of lower plate 14 is aligned with corresponding hole 18a of upper plate 12, and holes 26a and 26b of lower plate 14 are aligned with corresponding holes 20a and 20b of upper plate 12.

Referring now to FIG. 2, all of the holes are provided with a bevel 28 suitable for receiving rivet members therein. Free end portions 17 and 19 of corresponding upper and lower plates 12 and 14, are bent so as to be directed inwardly each toward the other plate when the connector member is bent into a U-shape. Thus, free end portions 17 and 19 engage opposite faces of the belt to thereby avoid upward bending of plates 12 and 14, respectively. In addition, as clearly shown in FIGS. 4, 9 and 14, the inwardly bent free end edges 17 and 19 are out of alignment with each other, so that upon full application of the connector member 10 to the belt, the latter is not pinched between these end edges (which, if permitted, could adversely affect the strength of the belt at the location of the pinch).

Turning once again to FIG. 1, upper plate 12 is joined to lower plate 14 by a pair of U-shaped portions 30 and 32. U-shaped portion 30 has a pair of tapered portions 30a and 30b in the region of the interior surface extending along the peripheral edge portions thereof. Similarly, U-shaped portion 32 also has a pair of tapered portions 32a and 32b also in the region of the interior surface extending along the peripheral edge portions thereof. The aforementioned tapered portions 30a, 30b, and 32a, 32b, are shown more clearly in FIG. 3. Tapered portions 30a, 30b nd 32a, 32b are relatively smooth and are designed to prevent sharp edges from engaging and cutting into the coating on the hinge pin. Since the tapered portions 30a, 30b and 32a, 32b prevent the connector members from biting into the coating one the hinge pin, the connector members, therefore, may pivot freely relative to one another over prolonged periods of usage.

A tongue member 34, as shown in FIG. 2, extends substantially at a 90° angle to lower plate 14. When connector member 10 is bent into a U-shape, as shown in FIG. 4, tongue member 34 extends substantially inwardly from lower plate 14 in the direction of upper plate 12. Tongue member 34 has sufficient length to engage the belt, designate generally at 35, when it is interposed between upper plate 12 and lower plate 14 of connector member 10. As depicted in FIG. 4, belt 35 is interposed between upper plate 12 and lower plate 14 with belt 35 abutting against tongue member 34.

Referring once again to FIG. 1, tongue member 34 has a width less than the width of the space provided between the pair of adjacent U-shaped portions 30 and 32. An arcuate portion 36 is formed in lower plate 14 in region 34a of the intersection of tongue member 34 with the interior peripheral edge portion 30c of U-shaped portion 30. Similarly, another arcuate portion 38 is formed in lower plate 14 in region 34a of the intersection of tongue member 34 with the interior peripheral edge portion 32c of U-shaped portion 32. Arcuate portions 36 and 38 have been found to reduce substantially the localized stress concentrations in the region of the intersection of tongue member 34 with U-shaped portions 30 and 32 respectively. By way of example, arcuate portions 36 and 38 have a radius of about one-sixteenth of an inch.

In bending connector member 10 into a U-shape, the portions 36 and 38 include an S shaped portion 40 (FIG. 4) for properly positioning the hinge pin in housing 42, in the region of tapered portions 30a, 30b, and 32a, 32b. Housing 42 is formed by the U-shaped portions 30 and 32 and tongue member 40 and is of a suitable size such that the hinge pin may be pressed down and easily inserted in and removed from the interior of the connector members.

As shown in FIGS. 4 and 5, conveyor belt 35 is interposed between upper plate 12 and lower plate 14.

Upper plate 12 is positioned on belt face 35b, and lower plate 14 is positioned on belt face 35c. A mandrel member, shown generally at 44, with a rivet member, shown generally at 46, removably secured thereto (see also FIGS. 10 and 11) is positioned over a hole, e.g., hole 24a of upper plate 12. Thereafter, mandrel member 44 having a sharp point and rivet member 46 are forced through belt 35 (FIG. 6) until the underside of head 48 of rivet member 46 is pressed into the beveled portion 28 of hole 24a in upper plate 12. Thereupon, bottom edge portion 50 of rivet member 46 normally protrudes through the corresponding aligned hole 18a of lower plate 14. Mandrel member 44 is secured to rivet member 46 by means of a strip of suitable adhesive tape 51. As rivet member 46 is forced to pass through belt 35, the friction between belt 35 and rivet member 46 peels tape 51 back away from rivet member 46, thereby disengaging mandrel member 44 from rivet member 46.

As shown in FIG. 7, mandrel member 44 separates from rivet member 46 after bottom edge portion 50 of rivet member 46 has passed through hole 18a. Thus mandrel member 44 is self-extracting from rivet member 46.

Rivet member 46 is held in place by spreading or forming the metal in the region of the bottom edge portion 50 thereof into lower flanged portion 53 (FIG. 9). This is achieved with rivet deforming member, designated generally at 52 in FIGS. 8, 9 and 12. Turning now to FIG. 12, rivet drforming member 52 includes a cylindrical body portion 54, preferably mad of suitable hardware steel. One end por-tion 56 of body portion 54 is chamfered so as to remove sharp edges therefrom, thereby reducing the possibility of injury to the operator while using rivet deforming mem-ber 52. The other end portion 58 of body portion 54 is tapered conically, i.e., a truncated cone. The free end 60 of end portion 58 has a case hardened steel tip 62 embedded therein.

Referring to FIG. 8, tip 62 of rivet deforming member 52 is inserted in aperture 64 of rivet member 46. Thereafter, as shown in FIG. 9, a force is applied, by suitable hammering of head 48 of rivet member 46, to clamp upper plate 12 against belt face 35b, and push tip 62 of rivet deforming member 52 into aperture 64 of rivet member 46. Tip 62 is pressed into aperture 64 until member 52 deforms or spreads the metal in the region of bottom edge portion 50 to thereby form a flanged portion 53 for tightly securing rivet member 46 against plates 12 and 14 of connector member 10. Thus, connector member 10 is, thereby, affixed to the end of conveyor belt 35 and rivet deforming member 52 may, thereupon, be disengaged from rivet member 46.

It is to be noted that the connector members, according to the present invention, can be attached to the ends of the belt, not only by means of the rivet members shown, as will be obvious to the man skilled in the art, but also may be attached to the belt ends with which they are associated, by means of threaded bolts, provided these additional attaching elements do not interfere with the pulleys about which the belt moves, or weaken the belt.

Referring now to FIG. 13, the fastener at each end of the belt, according to the preferred embodiment, comprises a number of single-section connector members 10 arranged generally intermediate a pair of dual-section U-shaped members 68 and 78, each of which corresponds to a pair of connector members 10 integrally joined to one another. The dual-section U-shaped member 68, which is disposed at one end of the belt 66, is formed in such a manner that it defines an entrance opening 70, in which the U-shaped portion 72 of the opposed dual-section U-shaped member 74 is inserted, which is secured to the other end 76 of the belt at the left edge thereof. In an actual belt, the connector members are in a complementary arrangement relative to one another, with their U-shaped portions interdigitated. As shown in FIG. 14, the respective tongue members 34 properly position belt ends 66 and 76 in connector members 68 and 74, to thereby leave a sufficiently large space therein to receive hinge pin 80. Hinge pin 80 passes through the housing 42 of all the connector members so as to link belt end 66 to belt end 76. The U-shaped portions of the connector members are adapted to engage the coating of the hinge pin so as to prevent lateral movement of the hinge pin. All of the connector members are riveted to the ends of the belt, as is apparent from FIGS. 6 through 9, inclusive, by means of rivet members 46 having flush heads, and, in which, a new head is formed on the opposed end, which also is flush with the outer surface of the connector members. As shown in FIG. 9, plates 12 and 14 of connector member 10 are pressed against belt 35 by rivet member 46, rivet member 46 having both heads flush with the outer surfaces of plates 12 and 14.

For use with a flat belt, the fastener, according to the present invention, does not need to be divided into sections unless greater or lesser lengths thereof are required. If, however, a length of a fastener, other than the usual length normally manufactured, is required for a particular width belting, such specific lengths are obtained merely by cutting the fastener at a predetermined point and attaching another length thereof suitable for forming the complete fastener which, at each of the ends, preferably has a double connector member, as set forth previously.

FIGS. 10 and 11 illustrate the manner in which rivet member 46 is mounted on mandrel member 44 for installation in the connector members and the conveyor belt. As shown in FIG. 11, rivet member 46 includes a body portion 82 having an axial bore or an aperture 64 in one end portion thereof and a head portion or a flanged portion 48 at the opposed end portion thereof. Aperture 64 preferably is substantially of a round or circular cross-section and extends in a substantially inwardly direction in the region of one end portion thereof. THe flanged portion 48 serves as the head of rivet member 46 and is beveled or conical so that when rivet member 46 is inserted into the holes of plates 12 and 14, head 46 is completely supported on beveled portion 28 of these holes and, thus, has a considerably increased strength, forming, in essence, an integral part of the connector member.

The rivet member 46 which is used to secure connector member 10 to the end of conveyor belt 35, according to the present invention, is mounted on mandrel member 44. Mandrel member 44 includes a shank portion 84 having a substantially circular cross-section, and being adapted to be received by aperture 64 of rivet member 46. Rivet member 46 is adapted to be engaged slidably with shank portion 84 of mandrel member 44 until bottom edge portion 50 of rivet member 46 is abutted against seat portion 86 of mandrel member 44. Seat portion 86 preferably is conical and tapers to mandrel body portion 88. Mandrel body portion 88, preferably, is cylindrical and at end portion 90, opposed to shank portion 84 thereof, preferably, tapers to a nail point. Mandrel member 44 terminates in a point in order to puncture the belt material by separating the cords of belt 35 without breaking them. Once bottom edge portion 50 of rivet member 46 has passed through belt 35 and lower plate 14 f the connector member 10 (FIG. 6), mandrel member 44 disengages from rivet member 46 (FIG. 7), and flange portion 53 is formed from bottom edge portion 50 of rivet member 46 (FIGS. 8 and 9) so that connector member 10 is securely attached to conveyor belt 35. The point of the mandrel member can be round or circular, or it may be of a pyramid or square cross-section. The latter configuration is capable of providing a sharper mandrel member, which separates the cords of fibers of the belt more effectively, and does not damage them.

Referring now to FIG. 10, rivet member 46 is mounted on shank portion 84 of mandrel member 44. Rivet member 46 is secured to mandrel member 44 by a strip of adhesive tape 51 wound about the joint between rivet member 46 and mandrel member 44. The maximum outer diameter, in the region of seat portion 86, of mandrel member 44, is substantially equal to the maximum diameter of body portion 82 of rivet member 46. The opening formed by mandrel member 46 in conveyor belt 35 is, therefore, approximately equal to the maximum diameter of body portion 82 of rivet member 46, there being preferably substantially no clearance therebetween. Thus, the wall of the opening in conveyor belt 35 will be substantially in engagement with body portion 82 of rivet member 46 As the mandrel member and rivet member push through the belt material, the tape peels away from the rivet member so as to release he mandrel member therefrom.

While the rivet member and mandrel member depicted in FIGS. 10 and 11 are the preferred embodiments thereof, it will be obvious to a man skilled in the art that the mandrel member may be constructed without a seat portion, i.e., having only a cylindrical body portion adapted to be received in the aperture of the rivet member and the end portion thereof tapered to a point. In conjunction therewith, the rivet member preferably has the bottom edge portion thereof beveled, the rivet member being supported on the end of the mandrel member opposed to the tapered portion thereof.

In carrying out the invention, it is preferably to designate specific holes in the connector member for receiving rivet members therein. Suitable rivet members are made of a hard corrosion resistant metal, e.g., stainless steel,straight steel, or an alloy such as monel. Typically the rivet members are made by cold forming the metal. The requisite fastener strength may be used as a criteria to determine the appropriate holes in which the rivet members are placed. Since belting may be made of a composite of materials such as rayon, nylon polyester or equivalent fibers, cords or fabrics coated with such materials as neoprene, sytrene-butadiene rubber, butyl rubber, polyurethane, or polyvinyl chloride plastic, the belt strength will vary with the material from which it is made and the thickness of the carcass thereof. The "pullout" strength of the fastener depends upon the strength of the belt on which is is secured, as well as the number an positioning of the rivet members therein. For any one particular type of belt, the "pullout" strength of the fastener varies for different rivet configurations, i.e., a different position or number of rivet members therein. Fastener "pullout" strength may, therefore, be varied by selecting the number and positioning of rivet members which will provide the requisite "pullout" strength for the belt on which the fastener is to be secured. Thus, according to the present invention, it is possible to "select" the requisite fastener "pullout" strength.

The variable load carrying feature of the present invention will be further explained in conjunction with the following example, wherein various rivet configurations were tested to determine the "pullout" values for the fastener of the present invention.

Table 1 discloses the results of testing different strength conveyor belts with various rivet configurations. The various rivet configurations shown therein are hereinafter described in conjunction with the connector member depicted in FIG. 1. In order to facilitate the description of the rivet configuration and for clarity, only the hole in upper plate 12 having a rivet member placed therein will be noted, it being understood that the corresponding aligned hole of lower plate 14 also has a rivet member placed therein. Moreover, holes in upper plate 12 not designated as having rivet members placed therein, are understood to have no rivet members placed therein. Hence, rivet configuration (A) has rivet members placed in holes 20a and 20b of upper plate 12. Rivet configuration (B) has rivet members placed in holes 20a, 20b and 18a, and rivet configuration (C) has rivet members placed in holes 20a, 20b, 16a, and 16b. Finally, rivet configuration (D) has rivet members placed in all of the holes of upper plate 12, i.e., holes 20a, 20b, 18a, 16a, and 16b.

The belting referred to in Table 1 and used in these tests is sold under the trademark Usflex by Uniroyal, Inc. The construction of the belting is described more fully in U.S. Pat. No. 3,148,710, issued to Rieger et al. on Sept. 15, 1964. Typically, this belting is specified by the tension rating thereof. For example, 150 Usflex belting has a tension rating of 150 lbs./inch. Generally, Usflex belting has a 10:1 safety factor, and, therefore, the failure point for the 150 Usflex belting is about 1,500 lbs./inch. The thickness of the carcass and the weave thereof are the primary indicia of the belt strength. By way of example, the 150 Usflex belting is about 0.080 inches thick, the 220 Usflex belting is about 0.120 inches thick, the 300 Usflex belting is about 0.140 inches thick, and the 400 Usflex belting is about 0.150 inches thick. The Usflex belting includes a carcass made of rayon and nylon, and rubber coatings placed on the top and bottom sides of the carcass.

Furthermore, the hinge fasteners are required to have a minimum safety factor of 4:1. Thus, the hinge fastener used on the ends of the 150 Usflex belting must have a tension rating of at least 600 lbs./inch.

Table 1 depicts the safety factors for a fastener having the rivet configurations hereinbefore described, and being used on different types of Usflex belting. The Usflex belts of these tests and referred to in Table 1 had different thickness rubber coatings on the top and bottom sides thereof. The 150 Usflex belting had a ⅛ inch thick rubber coating on the top side and a 1/16 inch thick rubber coating on the bottom side. The rubber coating on the top side of the 220 and 300 Usflex belting was three-sixteenths of an inch thick, while the bottom side had a 3/32 of an inch thick rubber coating. The 400 Usflex belting had a ¼ inch thick rubber coating on the top side and a ⅛ inch thick rubber coating on the bottom side. A dash, in Table 1, indicates that the safety factor for the specific rivet configuration and belting combination was below 4:1.

TABLE 1

Safety Factor

| Usflex belting Rivet configuration | 150 | 220 | 300 | 400 |
|---|---|---|---|---|
| A | 4.61:1 | — | — | — |
| B | 5.84:1 | 5.40:1 | 4.52:1 | 4.80:1 |
| C | 5.35:1 | 5.90:1 | 5.03:1 | 5.00:1 |
| D | 7.40:1 | 6.75:1 | 5.40:1 | 5.43:1 |

Thus, it is evident that depending upon the rivet configuration selected, the "pullout" strength of the fastener can be varied to achieve optimum strength for any particular belt utilized.

Moreover, while the invention has been described in connection with four rivet configurations, all of the holes of one or more rows having rivet members placed therein, one skilled in the art will appreciate that the invention is not so limited and that any number of rivet configurations may be utilized. For example, all the holes in any given row need not have rivet members placed therein, i.e., one hole in a row may have a rivet member placed therein, while another hole in the same row need not have a rivet member placed therein.

Hence, it is evident that the present invention is adapted to achieve the various aims and objectives hereinbefore set forth. Namely the connector members of the fastener are adapted to pivot freely relative to one another without biting into the plastic coated hinge pin connecting them to one another. Thus, the connector members remain free for pivotal movement after extensive usage. Furthermore, the fastener has a variable load carrying capability via the use of various rivet configurations. The rivet members may be installed by a mandrel member which produces an opening in the conveyor belt no larger than the diameter of the rivet body, thereby insuring that the wall of the opening is in substantial engagement with the rivet body. Hence, the rivet members are prevented from skewing and tightly secured the connector members to the ends of the belt. Moreover, after each rivet member has been driven through the belt, the associated mandrel member is automatically released from the rivet member, i.e., with the adhesive tape peeled away from the rivet member due to the friction in passing through the belt material, the mandrel member disengages from the rivet member just about when the bottom edge of the rivet member protrudes beyond the lower plate of the connector member. In addition, the mandrel members, rivet members and even the connector members are relatively inexpensive in the use and manufacture thereof.

Thus it is apparent that there has been provided, in accordance with the present invention, a hinge fastener and method of installation thereof that fully satisfies the objects, aims and advantages set forth hereinbefore. While the invention has been described in conjunction with specific embodiments thereof, it is evident that many alternatives, modifications, and variations will be apparent to those skilled in the at in light of the foregoing description. Accordingly it is intended to embrace all such alternatives, modifications, and variations as fall within the spirit and broad scope of the appended claims.

Having thus described my invention what I claim and desire to protect by Letters Patent is:

1. A conveyor belt, including an elongated belt body terminating in respective opposite ends, and a hinge fastener for pivotally connecting said belt ends to one another, said hinge fastener comprising:

at least one pair of connector members each clamped to a respective one of said belt ends, each of said connector members including an upper plate and a lower plate overlying and engaging the corresponding opposite faces of said belt body at the respective belt end in substantially parallel spaced relation with respect to one another, said upper and lower plates each having a respective plurality of rivet-receiving holes therein in axial alignment with the corresponding holes in the other plate, said upper and lower plates being connected to one another at one end edge thereof by at least two relatively narrower, laterally spaced, U-shaped portions integral with said upper and lower plates and arranged in an alternating sequence with a like number of free spaces, and each of said upper and lower plates having its respective free end edge bent inwardly toward the other plate out of alignment with the inwardly bent free end edge of the latter, said inwardly bent and edges being pressed into said opposite faces of said belt body at different distances from the respective belt end so as to avoid lifting of said plates from said belt body and so as to avoid pinching of said belt body between said end edges, each of said U-shaped portions being outwardly beveled along each of the lateral edge portions of its inner surface and defining a housing facing the respective belt end for receiving a hinge pin, said U-shaped portions of each of said connector members being received in said free spaces of the other of said connector members with the housing formed by one set of said U-shaped portions in alignment with the housings formed by the other set of said U-shaped portions;

at least one rivet member cooperating with each of said connector members, respectively, each of said rivet members being receive in a respective one of said holes of said upper plate of the respective connector member and extending through said belt body and the corresponding hole of said lower plate of said respective connector member and securing the same to the respective belt end, the number and distribution of said rivet members used in each of said connector members being coordinated with the physical properties of said belt body and with the intended load conditions to which the belt is to be subjected in use, to provide the belt in the region of said hinge fastener with optimum "pullout" strength and resistance to failure; and a hinge pin extending through said aligned housings so as to interconnect said connector members and thereby said belt ends pivotally to one another, said beveled edge portions of said U-shaped portions preventing excessive scoring of said hinge pin by said U-shaped portions.

2. A conveyor belt as recited in claim 1, wherein said holes in said upper and lower plates of each connector member are arranged in three transverse rows, a first row including two first holes disposed closest to said hinge pin, a second row including one second hole spaced farther from said hinge pin than said first holes, and a third row including two third holes spaced farther from said hinge pin that said second hole, said holes in each of said rows being staggered relative to said holes in each of the other rows.

3. A connector member adapted to be used in a hinge fastener for a conveyor belt, comprising:

an upper plate and a lower plate adapted to engage the corresponding opposite faces of the body of the belt at a respective end thereof and each having a plurality of rivet-receiving holes therein in axial alignment with the corresponding holes in the other plate; and at least two relatively narrower, laterally spaced, U-shaped portions integral with said upper and lower plates and connecting the latter to one another at one end edge thereof, said U-shaped portions being arranged in an alternating sequence with a like number of free spaces each adapted to receive a respective U-shaped portion of another connector member, each of said U-shaped portions being outwardly beveled along each of the lateral edge portions of its inner surface and defining a housing for receiving a hinge pin;

each of said upper and lower plates having its respective free end edge bent inwardly toward the other plate out of alignment with the inwardly bent free end edge of the latter, and the number and distribution of said holes in each of said upper and lower plates being predetermined to enable use of a selected arrangement of rivets for providing the belt in the region of the hinge fastener with optimum "pullout" strength and resistance to failure.

4. A connector member as recited in claim 3, wherein said holes in said upper and lower plates are arranged in three transverse rows, a first row including two first holes spaced closest to said U-shaped portions, a second row including one second holes spaced farther from said U-shaped portions than said first holes, and a third row including two third holes spaced farther from said U-shaped portions than said second hole, said holes in each of said rows being staggered relative to said holes in each of the other rows.

5. In combination, a connector member and a plurality of rivet means adapted to be used in a hinge fastener for a conveyor belt;

said connector member comprising:

an upper plate and a lower plate adapted to engage the corresponding opposite faces of the body of the belt at a respective end thereof and each having a plurality of rivet-receiving holes therein in axial alignment with the corresponding holes in the other plate; and at least two relatively narrower, laterally spaced, U-shaped portions integral with said upper and lower plates and connecting the latter to one another at one end edge thereof, said U-shaped portions being arranged in an alternating sequence with a like number of free spaces each adapted to receive a respective U-shaped portion of another connector member, each of said U-shaped portions being outwardly beveled along each of the lateral edge portions of its inner surface and defining a housing for receiving a hinge pin;

each of said upper and lower plates having its respective free end edge bent inwardly toward the other plate out of alignment with the inwardly bent free end edge of the latter, and the number and distribution of said holes in each of said upper and lower plates being predetermined to enable use of a selected arrangement of said rivet means or providing the belt in the region of the hinge fastener with optimum "pullout" strength and resistance to failure; and each of said rivet means comprising:

a mandrel member having a first end portion tapered to a point for penetrating through a belt body, and a second end portion axially spaced from said first end portion;

a rivet member having a head at one end and an axial bore at its other end, said bore being dimensioned to slidably receive said second end portion of said mandrel member, and said rivet member being adapted to be spread at said other end thereof for formation of a second head; and means coacting with both said rivet member and said mandrel member for releasably securing the latter to the former with said second end portion of said mandrel member receive in said bore.

6. In combination, a connector member and a plurality of rivet means adapted to be used in a hinge fastener for a conveyor belt;

said connector member comprising;

an upper plate and a lower plate adapted to engage the corresponding opposite faces of the body of the belt at a respective end thereof and each having a plurality of rivet-receiving holes therein in axial alignment with the corresponding holes in the other plate; and at least two relatively narrower, laterally spaced, U-shaped portions integral with said upper and lower plates and connecting the latter to one another at one end edge thereof, said U-shaped portions being arranged in an alternating sequence with a like number of free spaces each adapted to receive a respective U-shaped portion of another connector member, each of said U-shaped portions being outwardly beveled along each of the lateral edge portions of its inner surface and defining a housing for receiving a hinge pin;

each of said upper and lower plates having its respective free end edge bent inwardly toward the other plate, and the number and distribution of said holes in each of said upper and lower plates being predetermined to enable use of a selected arrangement of said rivet means for providing the belt in the region of the hinge fastener with optimum "pullout" strength and resistance to failure; and each of said rivet means comprising:

a mandrel member having a first end portion tapered to a point for penetrating through a belt body, and a second end portion axially spaced from said first end portion;

a rivet member having a head at one end and an axial bore at its other end, said bore being dimensioned to slidably receive said second end portion of said mandrel member, and said rivet member being adapted to be spread at said other end thereof for formation of a second head; and means coacting with both said rivet member and said mandrel member at the region of juncture thereof for releasably securing said members to one another with said second end portion of said mandrel member received in said bore of said rivet member, said securing means being adapted to be disengaged from at least one of said members in response to the respective rivet means being forced into and through the body of a conveyor belt, thereby to enable said mandrel member automatically to self-release from said rivet member upon substantially full penetration of said other end of the latter through the belt body.

7. The combination recited in claim 6, wherein the outer diameter of the body of said rivet member is less than that of said first-named head thereof and substantially equal to the maximum outer diameter of said mandrel member.

8. The combination recited in claim 6, wherein said securing means comprises an adhesive tape wound about and adhered to both said rivet member and said mandrel member at the region of the juncture therebetween, the adhesive strength of said tape being such as to permit it to be stripped from said rivet member and said mandrel member by the belt body upon the respective rivet means being forced therethrough, thereby to enable said mandrel member to self-release from said rivet member just about when the bored end of the latter has fully penetrated through the belt body.

9. The combination recited in claim 8, wherein the outer diameter of said mandrel member over the major portion of the body thereof is less than the outer diameter of the body of said rivet member, and said mandrel member is provided intermediate said first and second end portions thereof with a conically flaring portion defining an annular shoulder facing toward said second end portion so as to constitute a seat for the bored end of said rivet member, said conically flaring portion of said mandrel member having a maximum outer diameter just about equal to said outer diameter of said body of said rivet member and thereby further constituting a means for spreading the hole made in the belt body by said mandrel member to an extent just sufficient to pass said rivet member.

* * * * *